United States Patent [19]
Tranchand

[11] Patent Number: 5,847,915
[45] Date of Patent: Dec. 8, 1998

[54] STATIC ISOLATOR

[75] Inventor: Alain Tranchand, La Balme De Sillingy, France

[73] Assignee: Somfy, France

[21] Appl. No.: 992,191

[22] Filed: Dec. 17, 1997

[30] Foreign Application Priority Data

Jan. 8, 1997 [FR] France .................................. 97 00101

[51] Int. Cl.$^6$ ....................................................... H02H 3/22
[52] U.S. Cl. .............................. 361/111; 361/58; 361/110; 361/29
[58] Field of Search ................................ 361/56, 111, 86, 361/91, 110, 58, 29, 33

[56] References Cited

U.S. PATENT DOCUMENTS

| 3,851,218 | 11/1974 | York | 361/101 |
| 4,203,141 | 5/1980 | Bishop et al. | 361/18 |
| 4,819,117 | 4/1989 | Brennan et al. | 361/18 |

FOREIGN PATENT DOCUMENTS 2400787  4/1978  France .

*Primary Examiner*—Jeffrey Gaffin
*Assistant Examiner*—Michael Sherry
*Attorney, Agent, or Firm*—Laff, Whitesel, Conte & Saret, Ltd.

[57]  ABSTRACT

Static isolator for the DC supply circuit of a load (MO) in the event of a surge, consisting of a dipole intended to be inserted into the power circuit of the load and comprising means for detecting a surge (R1, R2, T3, CI), means for filtering and storing the supply voltage (C, R1), means for cutting off the supply to the load (T3, R2, R8, R9, T4, T1, R7, R4), means for detecting the disappearance of the supply voltage (C, R1, R3, R6, T6) and means for erasing the storage means (R2, R6, T3, T6).

4 Claims, 7 Drawing Sheets

STATIC ISOLATOR

FIELD OF THE INVENTION

The present invention relates to a static isolator for the DC supply circuit of a load in the event of a surge, consisting of a dipole intended to be inserted into the power circuit of the load, this dipole consisting of discrete components and comprising means for detecting a non-fleeting surge, means for filtering and storing the supply voltage which are intended to suppress the effect of a fleeting surge upon the energizing of the load and for retaining in memory the presence of the supply voltage and means for cutting off the supply to the load which are controlled by the means for detecting a surge.

PRIOR ART

Such an isolator is known from the patent U.S. Pat. No. 3,851,218. Its advantage over isolators consisting of a quadripole is that it can be substituted for a conventional fuse. In this static isolator the means for filtering and storing the supply voltage, which are intended to suppress the effect of a fleeting surge upon energizing the load, in particular upon starting a motor, consist conventionally of a capacitor in series with a resistor. Nothing is provided, however, for rapidly discharging the capacitor upon the interruption of the supply to the motor and to the isolator, so that the recovery time of the static isolator is relatively long, the capacitor having to be discharged across a resistor whose value is large.

SUMMARY OF THE INVENTION

In order to alleviate this drawback, the static isolator according to the invention is one in which the components of the dipole according to the invention furthermore constitute means for detecting the disappearance of the supply voltage and means for erasing the storage means.

The means for storing the supply voltage in general consisting essentially of a capacitor, the means of erasure constitute means for purging the electric charge of the capacitor.

According to a preferred embodiment of the invention, several components intervene moreover in more than one function, this making it possible to reduce the number of components of the circuit.

BRIEF DESCRIPTION OF THE DRAWINGS

This embodiment will be set out in greater detail with reference to the appended drawing in which.

DESCRIPTION OF THE PREFERRED EMBODIMENT(S)

The circuit represented comprises, in parallel between the terminals of the dipole, a resistor R3, a capacitor C in series with a resistor R1, an integrated circuit CI in series with a diode D and a resistor R6, a transistor T1 of PNP type in series with a resistor R4, a transistor T4 of NPN type in series with two resistors R8 and R9 and a transistor T3 of PNP type in series with a resistor R2. A reverse-voltage-biased Zener diode Z is wired in parallel with the capacitor C. The circuit furthermore comprises a fourth transistor T6 of NPN type whose base is linked to the common point of the diode D and of the resistor R6, the emitter being linked to the common point of the capacitor C and of the resistor R1, and the collector is linked to the common point of the resistors R8 and R9, this common point moreover being linked to the base of the transistor T3, and a resistor R4 across which the base of the transistor T1 is linked to the output S of the circuit CI. The base of the transistor T4 is linked to the collector of the transistor T1.

The role of the Zener diode is to limit the voltage at the terminals of the capacitor C.

The circuit CI is a threshold value circuit. If a voltage greater than its internal threshold occurs between its terminals E (input) and M (ground) its output S passes from a zero voltage to a positive voltage.

The diode D prevents destruction of the base-emitter junction of the transistor T6.

Figure 1:
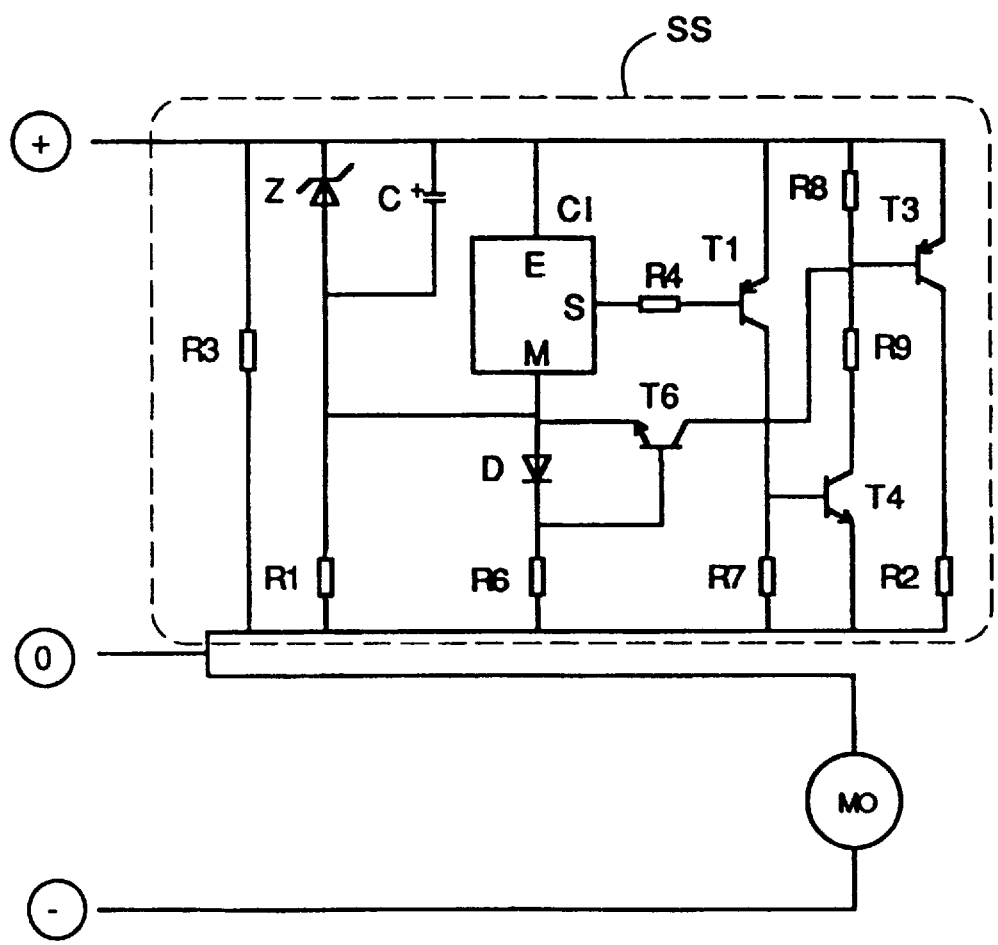
FIG. 1 represents the diagram of the static isolator.
Figure 2:
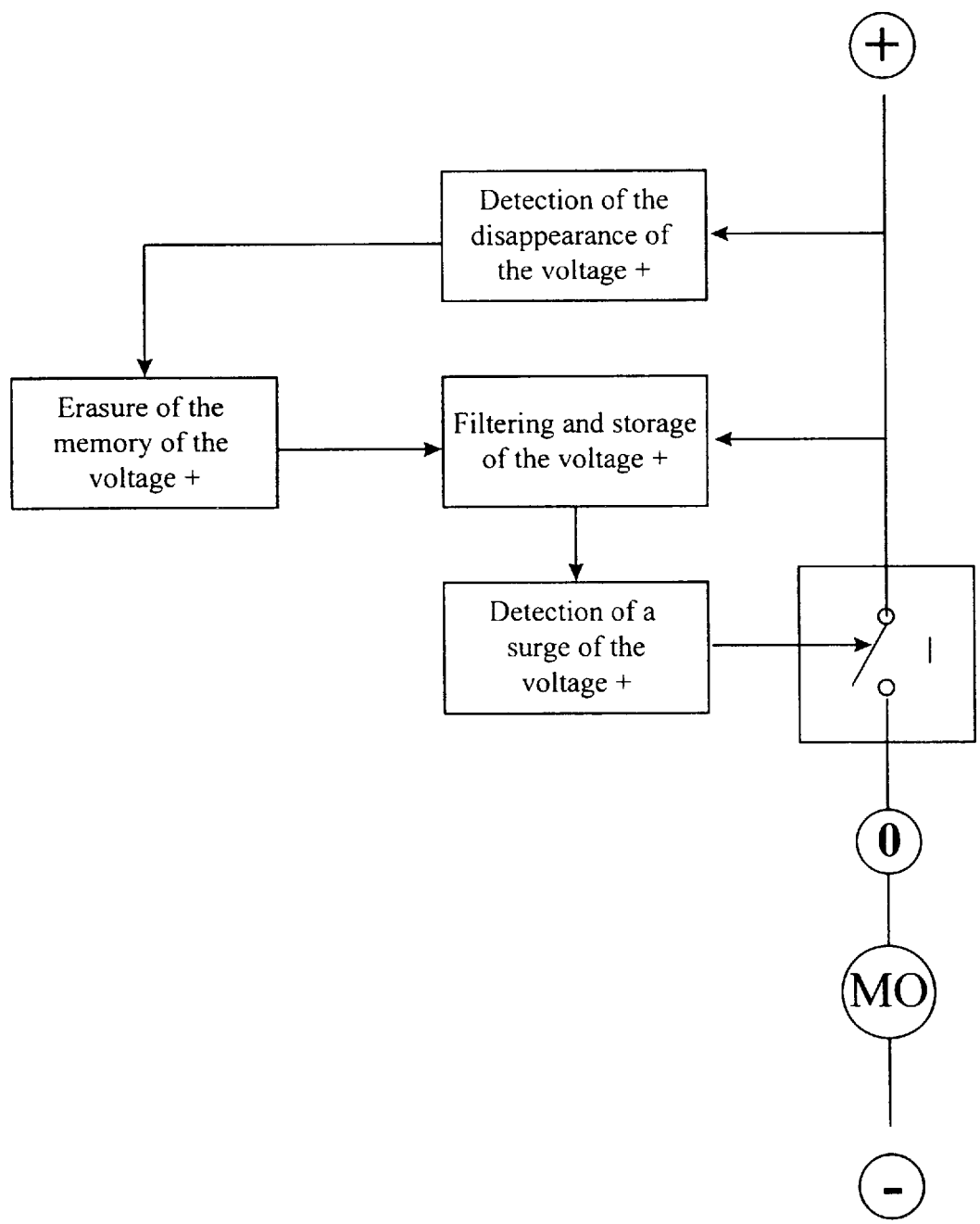
FIG. 2 represents, in block diagram form, the various functions fulfilled by the circuit of FIG. 1.

The circuit represented in FIG. 1 carries out the functions represented by rectangles in FIG. 1. These functions are:

filtering and storage of the voltage+ (supply voltage), detection of a surge, detection of the disappearance of the voltage+, erasure of the memory of the voltage+ (purging of the charge), interrupt, indicated by I.

Several of the components of the circuit participate in several functions. Thus, R1, C and T3 participate in three functions and R2, R6 and T6 participate in two functions.

Figure 3:
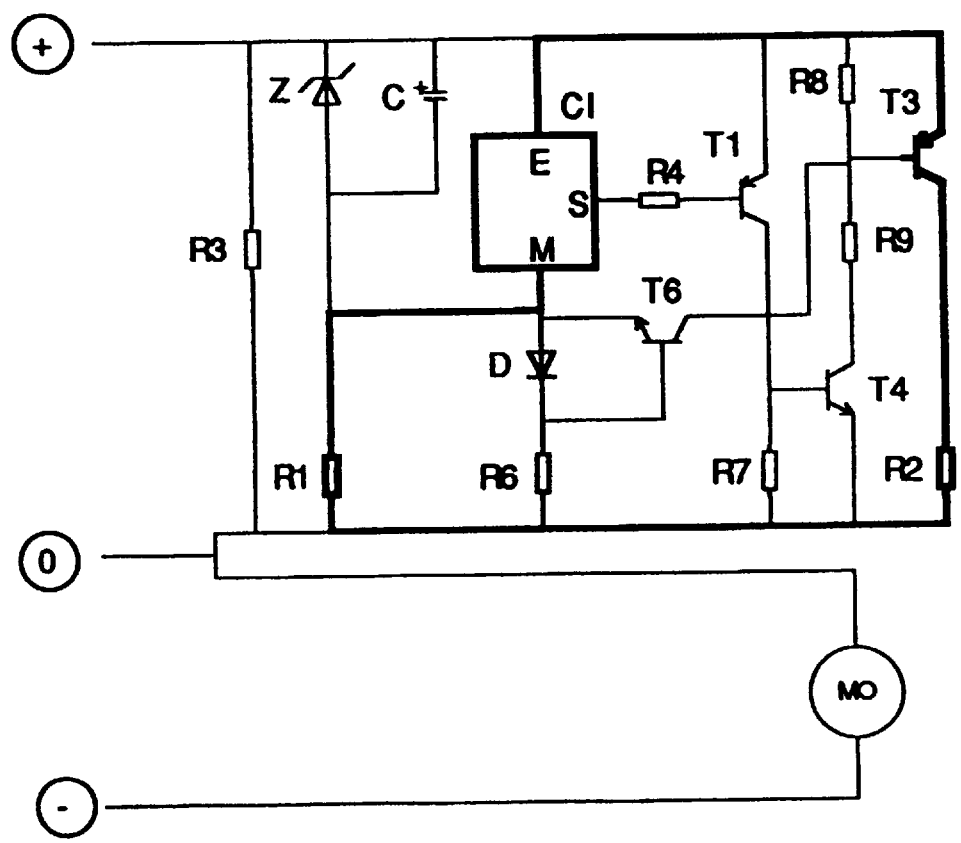
FIG. 3 shows, between heavy lines, the components of the circuit intervening in the surge detection function.

The surge detection function is represented in FIG. 3. The motor current passes through R2 creating therein a potential difference which is reproduced on the detection terminals of the circuit CI. The appearance of a voltage at the output S of CI signifies that there is a too large a voltage drop in R2, i.e. a surge.

Let us note that with this interrupt, the voltage at the terminals of the capacitor C increases up to the value of the Zener voltage of the diode Z, this tending to confirm detection of the presence of this voltage.

Figure 4:
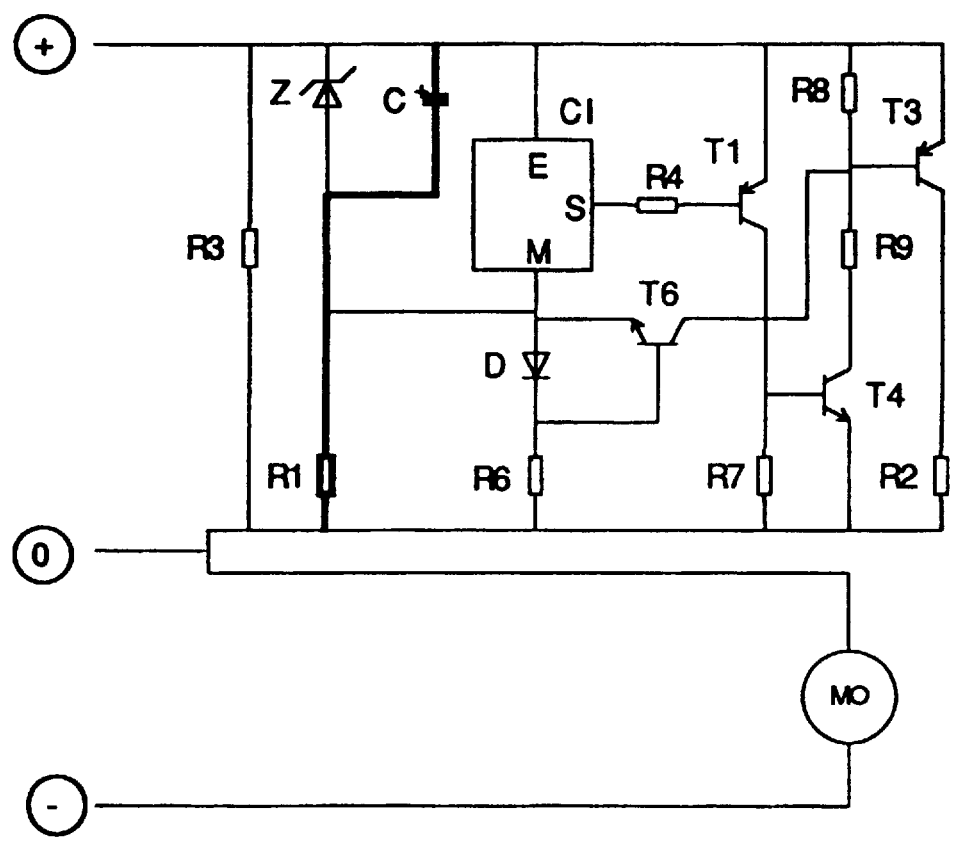
FIG. 4 shows, in heavy line, the components of the circuit intervening in the supply voltage filtering and storage function.

The voltage filtering and storage function is represented in FIG. 4.

Upon energizing the device, the current for starting the motor must not be perceived as a surge to be interrupted. This function is carried out by the capacitor C which is charged slowly enough across R1 for the circuit CI not to detect a voltage greater than its triggering threshold.

Once charged, the capacitor C retains a memory of the presence of the supply voltage (+).

Figure 5:
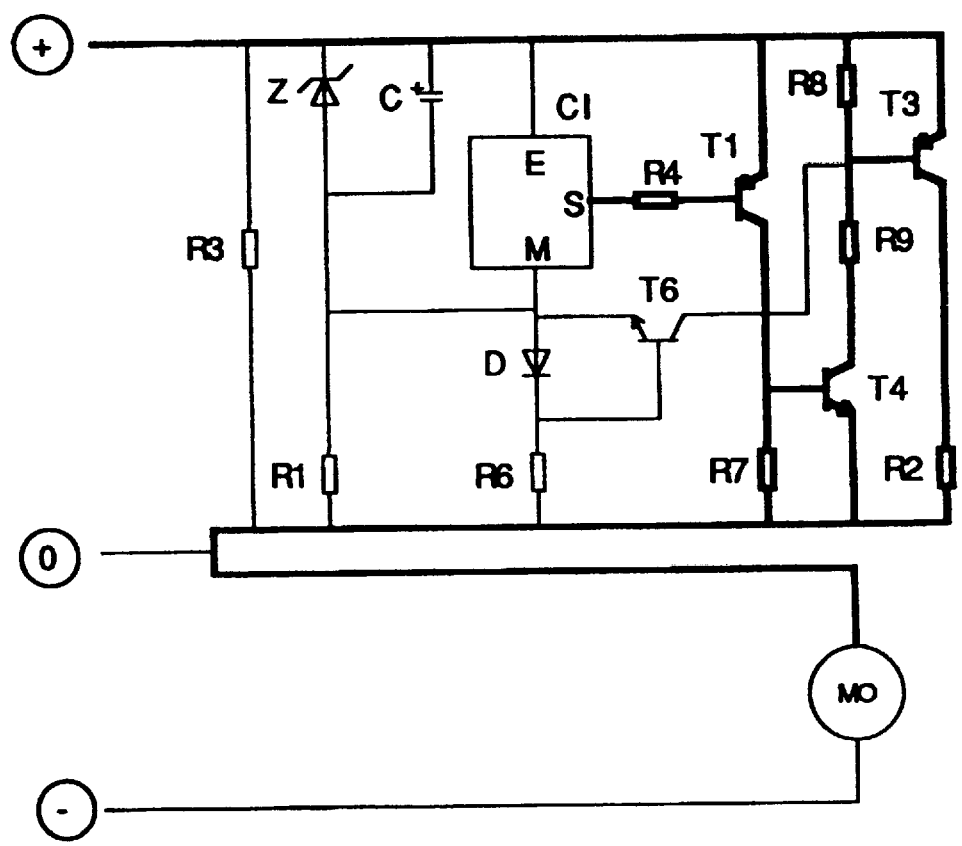
FIG. 5 shows, in heavy line, the components of the circuit intervening in the load supply cutoff function or interrupt function.

The interrupt function is represented in FIG. 5. When a voltage appears at the output S of the circuit CI, it causes the transistors T1 and T4 and the power transistor T3 to switch off. The motor current falls virtually to zero. Only a residual current through the resistor R3 remains.

Figure 6:
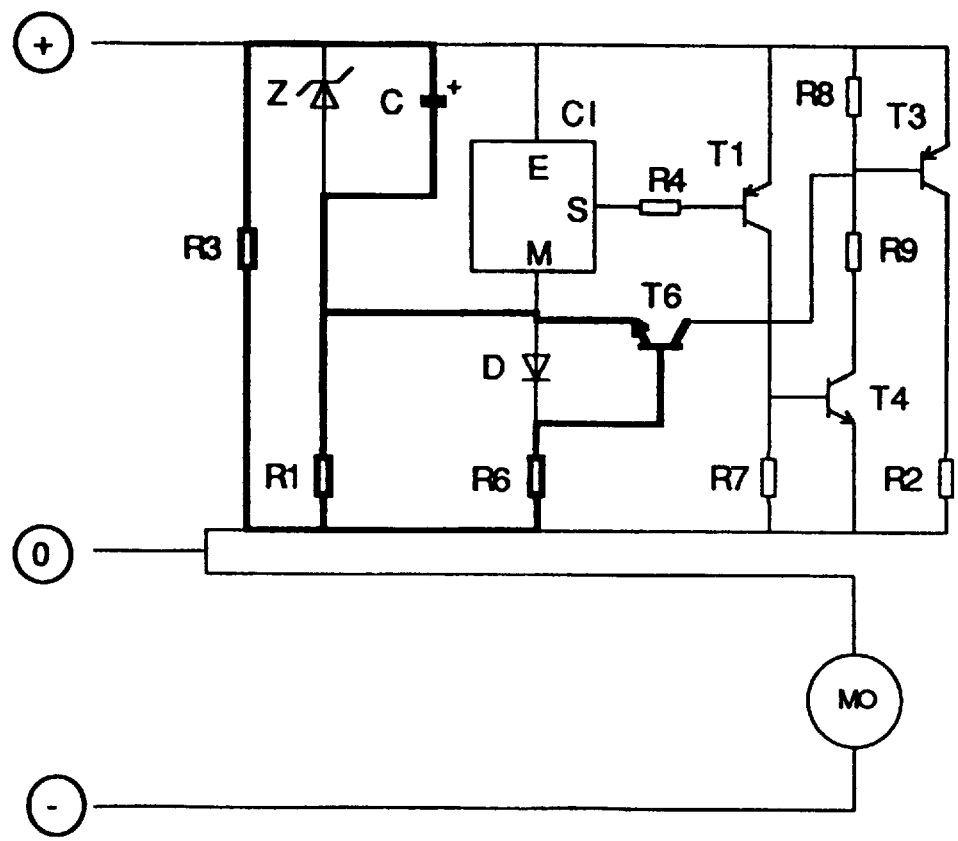
FIG. 6 shows, in heavy line, the components of the circuit intervening in the supply voltage disappearance detection function.

The function for detecting the disappearance of the supply voltage (+) is represented in FIG. 6.

When the supply is interrupted, in particular by virtue of a motor stop command and when the voltage+ of the device disappears, the capacitor C discharges across the resistors R1, R3 and R6 and the base-emitter junction of the transistor T6. It is conduction by this transistor which characterizes the detection of the disappearance of the voltage.

Figure 7:
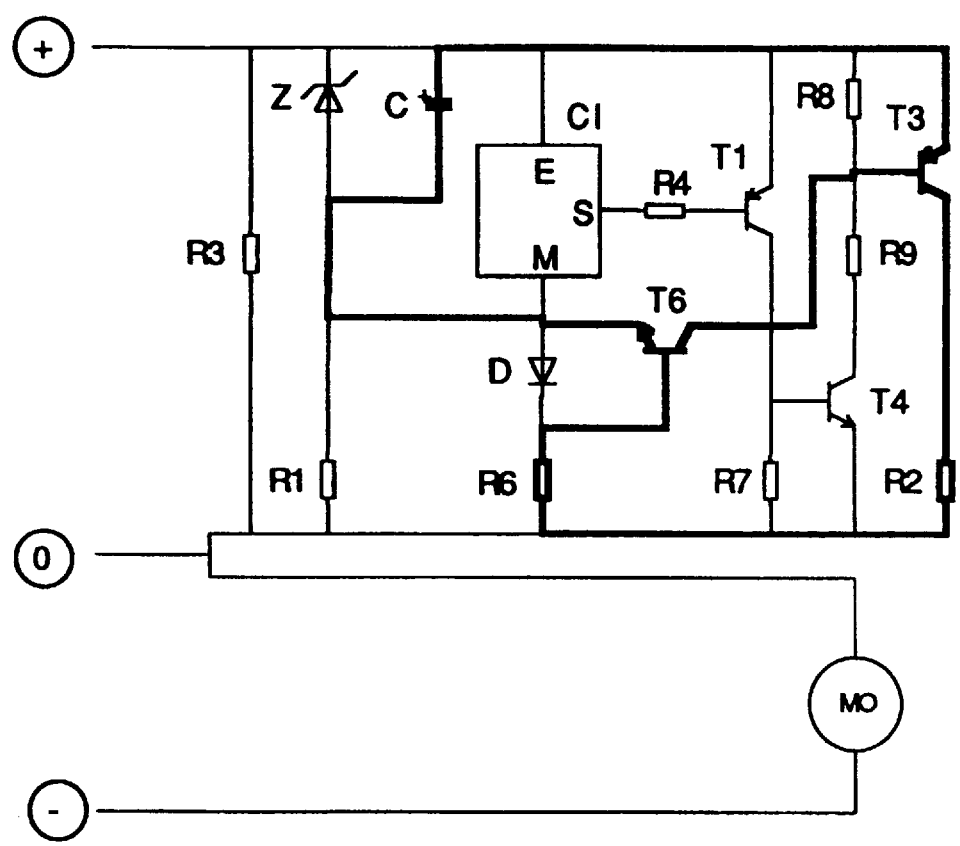
FIG. 7 shows, in heavy line, the components of the circuit intervening in the memory erase or electric charge purge function.

The memory erase or electric charge purge function is represented in FIG. 7.

Upon the interruption of the supply voltage, the charge of the capacitor C delivers a current which is looped through a power circuit consisting of the transistors T3 and T6. The resistor R3, which has served in the initiating of the detection of the disappearance of the voltage, is short-circuited, and conduction by the transistor T6 is ensured for much longer by R2 and R6.

This circuit is characterized by a small voltage drop, an indispensable characteristic for series installation, as well as by good accuracy of triggering, a small temperature drift, a very short recovery time and a small leakage current after triggering.

This circuit is characterized furthermore by a cost which is especially low in comparison with its performance.

I claim:

1. A static isolator for the DC supply circuit of a load (MO) in the event of a surge, consisting of a dipole (SS) intended to be inserted into the power circuit of the load, this dipole consisting of discrete components and comprising means for detecting a non-fleeting surge (R1, R2, T3, CI), means for filtering and storing the supply voltage (C, R1) which are intended to suppress the effect of a fleeting surge upon the energizing of the load and for retaining in memory the presence of the supply voltage and means for cutting off the supply to the load (T3, R2, R8, R9, T4, T1, R7, R4) which are controlled by the means for detecting a surge, wherein the components of the dipole furthermore constitute means for detecting the disappearance of the supply voltage (C, R1, R3, R6, T6) and means for erasing the storage means (R2, R6, T3, T6).

2. The static isolator as claimed in claim 1, wherein several components of the dipole (C, R1, R2, R6, T3, T6) intervene in more than one function of the dipole.

3. The static isolator as claimed in claim 2, wherein the means for filtering and storing the supply voltage consist essentially of a capacitor (C) and wherein the means of erasure consist of a short-circuit controlled by this capacitor (R2, R6, T3, T6).

4. The static isolator as claimed in claim 3, wherein the dipole is arranged between the positive terminal of the supply source and the load and wherein the dipole comprises, between its terminals, a first resistor (R3), a capacitor (C) in series with a second resistor (R1) and a Zener diode (Z) in parallel with the capacitor so as to limit the voltage at the terminals of the capacitor, an integrated circuit (CI), constituting a threshold value circuit, in series with a diode (D) and a third resistor (R6), the common point of the integrated circuit and of the diode being linked to the common point of the capacitor and of the second resistor, a first transistor (T1) in series with a fourth resistor (R7) and whose base is linked via a fifth resistor (R4) to the output (S) of the integrated circuit, a sixth and a seventh resistor (R8, R9) in series with a second transistor (T4) whose base is linked to the common point of the first transistor (T1) and of the fourth resistor (R7) and a third transistor (T3) in series with an eighth resistor (R2) and whose base is linked to the collector of the fourth transistor (T6), the emitter of this fourth transistor being linked to the common point of the capacitor (C) and of the second resistor (R1), its base being linked to the common point of the diode (D) and of the third resistor (R6), the means for detecting a surge being made up of the second (R1) and eighth (R2) resistors, of the integrated circuit (CI) and of the third transistor (T3), the means for filtering and storing the supply voltage being made up of the capacitor (C) and of the second resistor (R1), the means for cutting off the supply to the load being made up of the fourth, fifth, sixth, seventh and eighth resistors (R7, R4, R8, R9, R2) and of the first, second and third transistors (T1, T4, T3), the means for detecting the disappearance of the supply voltage being made up of the first, second and third resistors (R3, R1, R6), of the capacitor (C) and of the fourth transistor (T6) and the means for erasing the storage means being made up of the capacitor (C), of the third and fourth transistors (T3, T6) and of the third and eighth resistors (R6, R2).

* * * * *